United States Patent Office 3,705,231
Patented Dec. 5, 1972

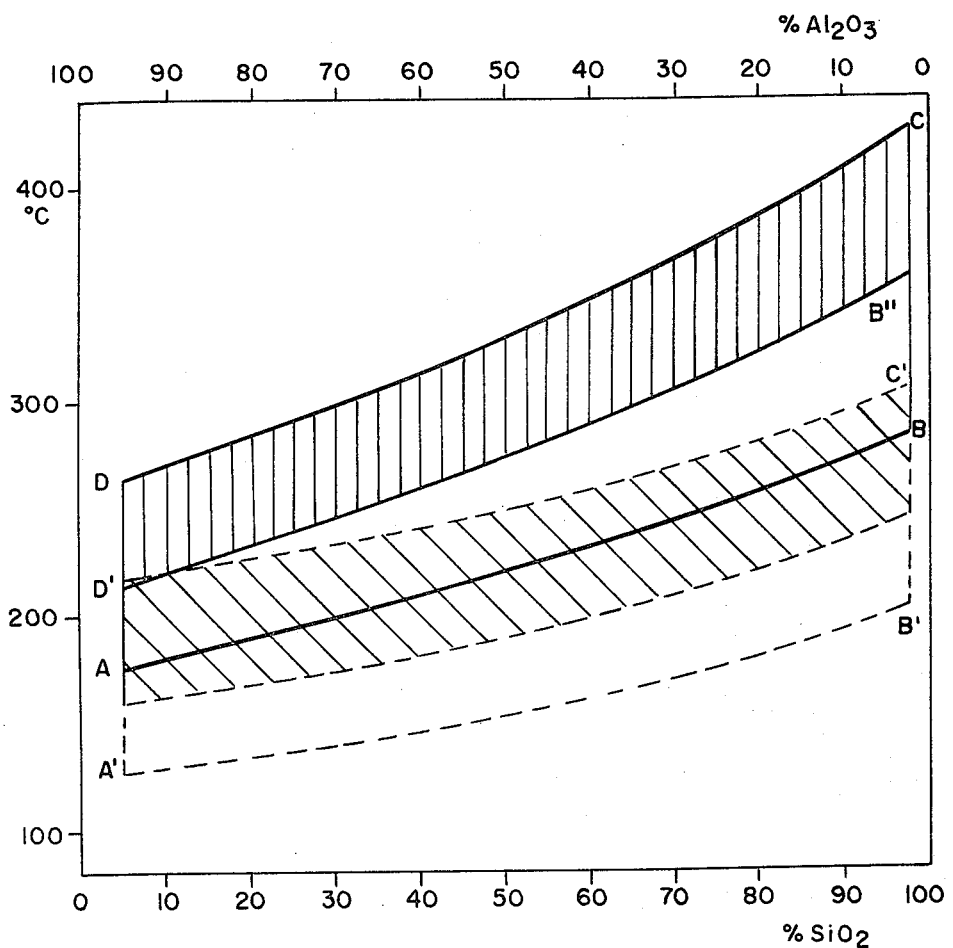

3,705,231
SELECTIVE REMOVAL OF NITROGEN DIOXIDE FROM GASES
Gerhard Biberacher, Ludwigshafen, Germany, assignor to Badische Anilin- & Soda-Fabrik Aktiengesellschaft, Ludwigshafen (Rhine), Germany
Filed July 21, 1970, Ser. No. 56,767
Claims priority, application Germany, July 24, 1969, P 19 37 552.1
Int. Cl. C01b 21/20
U.S. Cl. 423—239
4 Claims

ABSTRACT OF THE DISCLOSURE

Nitrogen dioxide is selectively removed from gases which contain not only nitrogen dioxide in strongly diluted form but also oxygen by reaction with carbon monoxide at elevated temperatures in the presence of supported catalysts of platinum and/or palladium. The reaction takes place at temperatures of from 130° to 425° C. and the carrier used is α-aluminum oxide or silicon dioxide. The ratio of these oxides to one another is chosen in accordance with the predetermined temperature.

---

This invention relates to the selective removal of nitrogen dioxide from gases.

Offgas which contains not only nitrogen dioxide in great dilution but also varying amounts of oxygen and other gases, for example nitrogen, is often obtained in the chemical industry, for example in the manufacture of nitric acid. The offgas from the manufacture of nitric acid may contain for example up to 0.5% by volume of nitrogen dioxide and up to about 5% by volume of oxygen. The presence of nitrogen dioxide in such gases is undesirable however on account of its strong corrosive properties, and many methods have become known for its removal from these offgases. These methods are based on a reductive conversion of nitrogen dioxide by reaction with a fuel in the presence of catalysts at elevated temperatures. Hitherto mainly precious metals such as platinum, palladium, rhodium and ruthenium have been used as catalysts; they may be applied to a carrier, for example aluminum oxide, silica gel and diatomaceous earth (German patent specification No. 1,145,147). The fuels used may be hydrogen, carbon monoxide, methane, natural gas and other gaseous hydrocarbons. As a rule natural gas is used as the fuel although when it is used it is necessary to employ fairly high temperatures to achieve good degrees of conversion. For example whereas natural gas will not react with nitrogen dioxide present in great dilution at a temperature of 200° C. in contact with a given catalyst and, when hydrogen is used as fuel, 80% of the nitrogen dioxide is reacted, carbon monoxide on the other hand gives a conversion of about 96% under otherwise the same conditions. When using natural gas, higher conversions are only obtained at high temperatures, the oxygen present in the offgas being of course also reacted so that the amount of fuel which has to be used for complete reaction of the nitrogen dioxide must be at least that stoichiometrically required for the reaction both with the nitrogen dioxide and with a large proportion or all of the oxygen. This has the disadvantage of an increased consumption of fuel and at the same time problems regarding materials are encountered because of the high temperatures.

The fact that carbon monoxide has not been used in practise for the reaction in question is mainly due to the fact that the optimum degree of reaction in contact with a given catalyst can only be achieved within a certain narrow range of temperature, and this optimum is shifted in the direction of higher temperatures in the case of prolonged periods of operation. This behaviour doubtless makes the industrial use of carbon monoxide as fuel more difficult because it is often not possible or at least not easy to set up a specific temperature range within which the two gases nitrogen dioxide and carbon monoxide react with each other optimally. On the other hand it would in fact be desirable to use carbon monoxide as the fuel on account of the low temperatures required, because for example the offgas from many nitric acid plants is usually obtained at a temperature of from 140° to about 425° C. depending on the process concerned.

It is an object of the present invention to provide a process for the selective removal of nitrogen dioxide from gases which contain not only nitrogen dioxide in great dilution but also oxygen, by reaction of the nitrogen dioxide with carbon monoxide at elevated temperatures in the presence of platinum and/or palladium as a catalyst which has been applied to aluminum oxide or silicon dioxide as a carrier, wherein the supported catalysts retain their original activity over a long period and the said reaction can be carried out at a fairly low temperature.

I have found that the said object can be achieved by carrying out the reaction at a temperature of from 130° to 425° C. using a carrier containing α-aluminum oxide and silicon dioxide and by selecting the ratio of aluminum oxide to silicon dioxide in dependence on the predetermined temperature so that it lies within the area A'B'DC in the accompanying diagram for the predetermined temperature.

The invention is based on the surprising discovery that to each specific temperature within the range from 130° to 425° C. a specific carrier can be assigned which is characterized by specific ratio of α-aluminum oxide:silicon dioxide and which produces optimum results for the predetermined temperature. Catalysts having carriers composed of α-aluminum oxide and silicon dioxide surprisingly exhibit no substantial change in their catalytic activity even over long operational periods. This discovery is all the more surprising because the carriers themselves have practically no catalytic activity in the reaction in question.

According to another feature of the invention low temperatures are used, namely from 130° to 305° C., employing a catalyst which preferably contains platinum as the active ingredient, the composition of the carrier at these temperatures being advantageously that indicated by the area A'B'C'D' in the accompanying diagram. Particularly good results are achieved at temperatures of from 160° to 305° C. when the composition of the carrier at the temperature in question corresponds to the area ABC'D' hatched with inclined lines.

On the other hand, when using higher temperatures, namely from 175° to 425° C., catalysts are employed which preferably contain palladium as active ingredient, the most favorable composition of the carrier resulting from the area ABCD of the diagram. It is particularly advantageous to use temperatures of from 215° to 425°

C. and carriers whose ratio of aluminum oxide to silicon dioxide at the given temperature is defined by the portion of the area ABCD hatched with vertical lines.

For example, at a temperature of 240° C. and using palladium as the catalyst, optimum results are obtained with carriers containing 95 to 67% by weight of α-aluminum oxide, advantageously 95 to about 75% by weight of α-aluminum oxide, in addition to silicon dioxide. Platinum may also be used as the catalyst at this temperature and in this case (as may also be seen from the diagram) a carrier should be used which contains from 40.0 to 2.0% by weight, advantageously from 40.0 to 7.0% by weight, of α-aluminum oxide in addition to silicon dioxide. Obviously it is also possible to use catalysts which contain both platinum and palladium as active ingredients, and in this case carriers should be chosen corresponding approximately to the means of the above values for the pure active ingredients.

Generally speaking, it can be said that at lower temperatures carriers having a higher α-aluminum oxide content are preferred, whereas at higher temperatures a higher content of silicon dioxide gives more favorable results. At a given temperature, the particularly favorable composition lies on the side of a higher content of α-$Al_2O_3$ given by the area in question, according to the hatched regions, because any slight deterioration which might occur is thereby compensated for.

The supported catalysts to be used for the process according to this invention and which may for example be in the form of strands or pellets, may be prepared by any conventional method. Thus for example powdered α-aluminum oxide and silicon dioxide may be shaped and then activated by heat treatment. The carrier may be impregnated with suitable solutions of platinum or palladium compounds prior to or after the heat treatment. The said metal compounds are then reduced to the corresponding metals by thermal and/or reductive treatment. The supported catalysts may advantageously contain from about 0.1 to 5.0% by weight of catalytically active metal. The throughput of the gas to be treated may be varied within the wide limits and is advantageously from 5000 to 20,000 m.³ (STP) of gas per m.³ of catalyst per hour at atmospheric pressure; higher throughputs are possible when the gases are under superatmospheric pressure.

The process is eminently suitable for removing nitrogen dioxide from offgases which contain this gas only in low concentrations. Reaction of the carbon monoxide with nitrogen dioxide is somewhat impaired by any nitrogen monoxide present in the offgases but even in this case it is possible to achieve a satisfactory conversion of nitrogen dioxide.

The carbon monoxide used as fuel and which reacts at the temperatures in question with the nitrogen dioxide to form nitrogen monoxide, may be used in a stoichiometric amount with reference to the nitrogen dioxide to be removed, but it is preferred to use a slight excess, for example from 1.2 times to twice the amount stoichiometrically required. Larger amounts of fuel are not necessary because excess carbon monoxide reacts with the oxygen which is also present to form carbon dioxide. In nitric acid manufacture the carbon monoxide may be added at any suitable point depending on the conditions existing in the plant because it is not affected by the compression and oxidation of nitrous gases and passage through the nitric acid absorption column. It is only in contact with the catalyst that it is oxidized into carbon dioxide. The small amount of carbon monoxide required for the process is therefore advantageously not added immediately ahead of the catalyst but some distance upstream thereof, for example upstream of the compression or absorption unit for the nitrous gases. Consequently it is not even necessary to provide special mixing equipment since the gases are adequately mixed on their way to the catalyst.

The process according to the invention makes it possible to utilize to the full the advantages of the reaction of carbon monoxide with nitrogen dioxide over the reaction with other fuels without the disadvantages described above having to be put up with, namely a change in the activity of the catalyst at a specific given temperature. It is possible to choose the carrier having the most favorable effect at a given temperature or, conversely, to provide the most favorable temperature for a catalyst carrier.

The invention is illustrated by the following examples.

EXAMPLE 1

(A) An industrial offgas under a pressure of 7 atmospheres absolute containing 0.04% by volume of $NO_2$ and about 3% by volume of oxygen (the remainder being nitrogen) is simulated in the laboratory at atmospheric pressure by making up a gas containing 0.28% by volume of $NO_2$ and about 21% by volume of $O_2$ (the remainder being nitrogen). A stream of this gas is passed with an addition of 0.5% by volume of CO over supported catalysts as set out in Table 1 (each containing 0.5% by weight of platinum or palladium with reference to the whole carrier) at a space velocity of 5000 liters of gas per liter of catalyst per hour. The temperature at the entry into the catalyst bed is varied between 100° and 430° C. During the experiment the $NO_2$ content is monitored photometrically upstream and downstream of the catalyst.

Depending on the temperature, the quantities of $NO_2$ removed (in percent by volume of the $NO_2$ introduced) indicated in Table 1 are obtained for the various catalysts. For each catalyst there is an optimum temperature range giving conversions of about 92 to 95%. The optimum range in each case extends over as much as about 90° to 130° C. The position of the optimum range depends to a marked extent on the chemical constitution of the carrier.

In Table 1, the first six columns give the amounts of $NO_2$ removed in percent by volume of the $NO_2$ introduced using palladium (columns 1, 3 and 5) and platinum (columns 2, 4 and 6) catalysts on mixed carriers composed of $SiO_2$ and α-$Al_2O_3$ in the ratio 95/5 (columns 1 and 2), 50/50 (columns 3 and 4) and 10/90 (columns 5 and 6). Column 7 gives the temperature in ° C.

TABLE I

| Temperature, ° C.: | 95/5 Pd | 95/5 Pt | 50/50 Pd | 50/50 Pt | 10/90 Pd | 10/90 Pt |
|---|---|---|---|---|---|---|
| 420 | 92 | | | | | |
| 410 | 92.5 | | | | | |
| 400 | 93 | | | | | |
| 390 | 93.5 | | | | | |
| 380 | 94 | | | | | |
| 370 | 94 | | | | | |
| 360 | 94.5 | | | | | |
| 350 | 94.5 | | | | | |
| 340 | 95 | | 89 | | | |
| 330 | 94.5 | | 92 | | | |
| 320 | 94.5 | 89 | 93 | | | |
| 310 | 94 | 90 | 93.5 | | | |
| 300 | 93.5 | 91 | 94 | | 87.5 | |
| 290 | 93 | 92 | 94.5 | | 89 | |
| 280 | 92 | 92.5 | 94.5 | 87 | 90.5 | |
| 270 | 91 | 93 | 94 | 89 | 92 | |
| 260 | 90 | 93.5 | 93.5 | 91 | 94 | |
| 250 | 89 | 94 | 93.5 | 92 | 94.5 | 86 |
| 240 | | 94 | 93 | 93 | 95 | 89 |
| 230 | | 93.5 | 92.5 | 93.5 | 95.5 | 91 |
| 220 | | 93 | 92 | 94 | 95.5 | 92 |
| 210 | | 92.5 | 91 | 94.5 | 95 | 93 |
| 200 | 78 | 92 | 90 | 95 | 94 | 93.5 |
| 190 | | 90 | | 95 | 93 | 94 |
| 180 | | 87 | | 94.5 | 91.5 | 94.5 |
| 170 | | | | 93.5 | 90 | 95 |
| 160 | | | | 92.5 | | 95 |
| 150 | | 65 | 79 | 91 | 84 | 94.5 |
| 140 | | | | 89 | | 94.5 |

(B) Under otherwise identical conditions to those in Example 1 (A), supported catalysts are tested which contain as the carrier pure α-aluminum oxide or silicon dioxide. In each case the oxides used as carriers contain 0.5% by weight of palladium or platinum based on the whole carrier.

Table 2 gives the quantities of NO₂ removed (in percent by volume of the NO₂ introduced) with a palladium catalyst (columns 1 and 3) or a platinum catalyst (columns 2 and 4) supported on SiO₂ (columns 1 and 2) or α-Al₂O₃ (columns 3 and 4), the temperature in ° C. being given in column 5.

TABLE 2

| Temperature, ° C. | SiO₂ Pd | SiO₂ Pt | Al₂O₃ Pd | Al₂O₃ Pt |
|---|---|---|---|---|
| 400 | | | | |
| 390 | | | | |
| 380 | | | | |
| 370 | | | | |
| 360 | 90 | | | |
| 350 | 92 | | | |
| 340 | 93 | | | |
| 330 | 94 | | | |
| 320 | 95.5 | | | |
| 310 | 94.5 | | | |
| 300 | 94 | | | |
| 290 | 93 | | | |
| 280 | 91.5 | | | |
| 270 | | | | |
| 260 | | | | |
| 250 | 82 | | | |
| 240 | | 84 | 88 | |
| 230 | | 88 | 91 | |
| 220 | | 91 | 93 | |
| 210 | | 95 | 94 | |
| 200 | 55 | 96 | 95 | |
| 190 | | 94 | 95.5 | |
| 180 | | 89 | 94 | 87 |
| 170 | | | 92 | 92 |
| 160 | | | 88 | 94.5 |
| 150 | | 53 | 85 | 96 |
| 140 | | | | 96 |

It will be seen that, in contrast to the supported catalysts set out in Table 1, the optimal activity is limited to a narrow temperature range. In the ageing of these catalysts during prolonged operational periods, this range is shifted in the direction of higher temperatures so that such catalysts are not suitable for a purification process operated under fixed temperature conditions.

I claim:
1. A process for the selective removal of nitrogen dioxide from a gas which contains nitrogen dioxide in great dilution together with oxygen, in particular from an offgas obtained in the manufacture of nitric acid, by reacting the nitrogen dioxide with carbon monoxide at an elevated temperature in the presence of palladium as catalyst which is supported on a carrier wherein:
the reaction is carried out at a temperature of from 175° to 425° and the carrier used consisting essentially of α-aluminum oxide and silicon dioxide, the ratio of α-aluminum oxide to silicon dioxide being chosen in dependence on the predetermined temperature so that it lies within the area ABCD in the accompanying diagram, wherein the coordinates for A, B, C and D respectively are (A) 175° C., 5% SiO₂; (B) 285° C., 98% SiO₂; (C) 425° C., 98% SiO₂; and (D) 267° C., 5% SiO₂.

2. A process for the selective removal of nitrogen dioxide from a gas which contains nitrogen dioxide in great dilution together with oxygen, in particular from an offgas obtained in the manufacture of nitric acid, by reacting the nitrogen dioxide with carbon monoxide at an elevated temperature in the presence of platinum as catalyst which is supported on a carrier wherein:
the reaction is carried out at a temperature of from 130° to 305° and the carrier used consisting essentially of α-aluminum oxide and silicon dioxide, the ratio of α-aluminum oxide to silicon dioxide being chosen in dependence on the predetermined temperature so that it lies within the area A'B'C'D' in the accompanying diagram, wherein the coordinates for A', B', C' and D' respectively are (A') 130° C, 5% SiO₂; (B') 202° C., 98% SiO₂; (C') 305° C., 98% SiO₂; and (D') 216° C., 5% SiO₂.

3. A process for the selective removal of nitrogen dioxide from a gas which contains nitrogen dioxide in great dilution together with oxygen, in particular from an offgas obtained in the manufacture of nitric acid, by reacting the nitrogen dioxide with carbon monoxide at an elevated temperature in the presence of platinum as catalyst which is supported on a carrier wherein:
the reaction is carried out at a temperature of from 160° to 305° and the carrier used consisting essentially of α-aluminum oxide and silicon dioxide, the ratio of α-aluminum oxide to silicon dioxide being chosen in dependence on the predetermined temperature so that it lies within the area ABC'D' in the accompanying diagram, wherein the coordinates for A, B, C' and D' respectively are (A) 175° C., 5% SiO₂; (B) 285° C., 98% SiO₂; (C') 305° C., 98% SiO₂; and (D') 216° C., 5% SiO₂.

4. A process for the selective removal of nitrogen dioxide from a gas which contains nitrogen dioxide in great dilution together with oxygen, in particular from an offgas obtained in the manufacture of nitric acid, by reacting the nitrogen dioxide with carbon monoxide at an elevated temperature in the presence of palladium as catalyst which is supported on a carrier wherein
the reaction is carried out at a temperature of from 215° to 425° and the carrier used consisting essentially of α-aluminum oxide and silicon dioxide, the ratio of α-aluminum oxide to silicon dioxide being chosen in dependence on the predetermined temperature so that it lies within the area CB''D'D in the accompanying diagram, wherein the coordinates for C, B'', D' and D respectively are (C) 425° C., 98% SiO₂; (B'') 355° C., 98% SiO₂; (D') 216° C., 5% SiO₂; and (D) 267° C., 5% SiO₂.

References Cited
UNITED STATES PATENTS

| 3,161,605 | 12/1964 | Beck et al. | 252—466 PT X |
| 2,970,034 | 1/1961 | Anderson et al. | 23—2 S |
| 3,245,920 | 4/1966 | Keith et al. | 23—2 S X |
| 3,279,884 | 10/1966 | Nonnenmacher et al. | 23—2 S |
| 3,467,491 | 9/1969 | Hardison | 23—2 S |

OSCAR R. VERTIZ, Primary Examiner

C. B. RODMAN, Assistant Examiner

U.S. Cl. X.R.

423—402; 252—466 PT